United States Patent Office 2,952,250
Patented Sept. 13, 1960

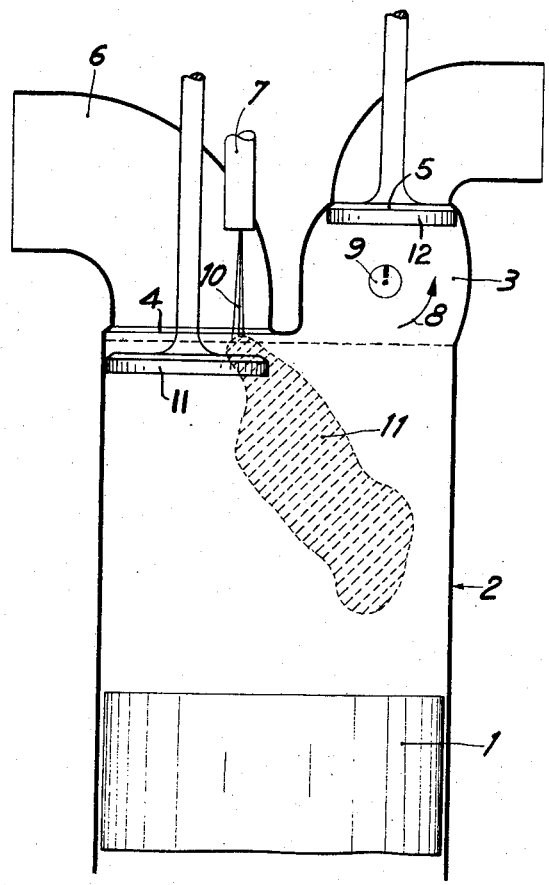

2,952,250

FUEL INJECTION SYSTEM FOR INTERNAL COMBUSTION ENGINES

Edmond Henry-Biabaud, Paris, France, assignor to Societe Anonyme Andre Citroen, Paris, France Filed May 29, 1958, Ser. No. 738,787

Claims priority, application France Oct. 10, 1957

2 Claims. (Cl. 123—28)

In a former patent, No. 2,687,339, there is described a method of injecting fuel into a spark-ignition internal combustion engine, wherein a non-homogeneous or stratified mixture of air and fuel is prepared, the stratification and a high turbulence of the complete mixture being associated at the end of the compression stroke, to permit the combustion of either rich mixtures yielding a high power output, or lean mixtures—leaner than those permitted by conventional carburetion methods—and to give a higher engine efficiency.

However, in this former patent only the direct injection into the combustion chamber or the engine cylinder is contemplated; now the direct-injection equipment is costly and complicated.

This invention is concerned with a form of embodiment of this general method which affords the same advantages as direct injection and is characterized in that the fuel injection is effected in the induction pipe shortly after the beginning of the induction stroke.

The basic idea of this invention is that it is theoretically possible to obtain a heterogeneous mixture by injecting the fuel near the intake valve during a relatively short time period with respect to the air-intake period; under these conditions, it is evident that at a certain moment the engine will draw a very rich mixture (during the injection phase proper), and pure air during the remaining time period.

Exhaustive tests carried out on these lines with engines identical to those operating satisfactorily with the direct-injection system led to complete failure; these engines were operated satisfactorily with normal mixtures but were not capable of burning the lean mixtures. Further tests proved that if the engine was so designed that the intake turbulence were less pronounced than in the case of direct injection, the proper and correct results could be obtained with very lean mixtures, exactly as in the case of direct injection.

Consequently, for carrying out this type of combustion to advantage, it is necessary that the turbulence be reduced to a minimum during the induction stroke; this implies a very accurate design of the induction pipe; on the other hand, for a given cubic capacity of the engine, the lower the velocity of the induction air, and therefore the greater the diameter of the intake valve, the better the results. More particularly, the best results are obtained with short piston strokes and large piston diameters.

Consequently, an engine suitable for carrying out the method broadly set forth hereinabove is characterized by specific dispositions affording:

(1) an air intake having the minimum possible turbulence and, to this end, a very regular and simplified shape of the induction pipe, in combination with the largest possible intake valve;

(2) the injection of fuel in close proximity of the intake valve during a short time period in comparison with the complete induction time, so as to provide a heterogeneous mixture;

(3) the production, at the end of the compression stroke, of a high turbulence throughout the mixture, and the ignition of the heterogeneous mixture produced beforehand in the turbulent zone;

(4) a modification or a complement to disposition (2), whereby the injector is so positioned that the fuel injected at a given moment flows across only one portion of the valve periphery, thus creating a heterogeneous mixture.

An engine constructed according to the above requirements will give the novel result (for an injection engine wherein the injection proper is effected into the induction pipe) that it will burn (with yields exceeding conventional figures) very lean mixtures wherein the excess of air may exceed 50 percent, as well as rich mixture, with a high power output.

In order to afford a clearer understanding of this invention and of the manner in which the same may be carried out in the practice, reference will now be made to the attached drawings forming part of this specification and illustrating diagrammatically by way of example a cylinder with its piston in the bottom dead centre position. In the drawings:

Figure 2 is a similar diagram illustrating a modified embodiment.

Figure 1:
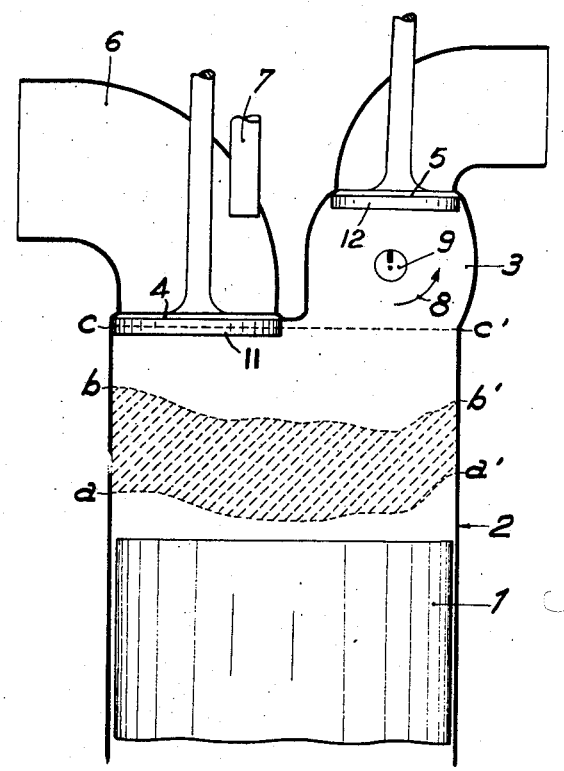
Figure 1 is a diagram illustrating a first form of embodiment.

The piston 1 moves in the cylinder 2 and the cylinder-head consists of a turbulence chamber 3, of the intake valve seat 4 engaged by the inlet valve 11 in its closed position and of exhaust valve seat 5 engaged by the exhaust valve 12 in its closed position. The intake pipe 6 has a very regular shape and an injector 7 extends through its wall. During the initial part of the induction stroke only pure air is drawn and forms a layer overlying the piston. Shortly after the beginning of the induction stroke, the fuel injection takes place and then ceases. During the final part of the induction stroke only pure air is drawn into the cylinder. The induced mixture may be represented diagrammatically in the form of a zone of pure air overlying the piston, as already stated, followed by a high fuel content zone extending from $a$—$a'$ to $b$—$b'$, and, above this fuel zone, pure air. This, of course, is but a very simplified illustration of the phenomenon, as the various zones are actually not so definite and regular.

As the piston rises in the cylinder it drives the mixture, in the vicinity of the top dead centre $c$—$c'$, towards the turbulence chamber as indicated by the arrow 8 so as to impart a strong turbulence to the complete mixture; then the mixture is ignited by the spark plug 9 placed in the turbulence chamber.

In the foregoing it is assumed that during the injection step the air-fuel mixture flowing through the intake port around the valve was, at a given moment, substantially of same composition at all points of the valve periphery. Now the stratification effect may be increased by so directing the fuel jet that it will not mix in the same manner with the air around the valve; thus, the fuel may be directed as shown at 10 in Fig. 2. In this case the injection time may be extended and the resulting stratification has a different shape; the very rich mixture is drawn in a zone having substantially the form shown at 11, the remaining portions of the cylinder displacement being filled with either very lean mixture or pure air.

What I claim is:

1. A method of supplying fuel to an internal combustion engine comprising an inlet manifold through which air is drawn during its induction into the engine, which comprises the steps of injecting the fuel into the induction manifold shortly after the beginning of the induction cycle, effecting this induction into the engine with the minimum possible turbulence, the fluid thus induced consisting therefore firstly of pure air, then of a very rich mixture and finally of a leaner mixture, the engine being filled during the last part of the induction cycle with a non-homogeneous mixture, and producing at the end of the compression cycle a high turbulence of the whole of said non-homogeneous mixture in the turbulence zone.

2. A method of supplying fuel to an internal combustion engine comprising an induction manifold through which the induction air is drawn during its induction into the engine, and a valve opening and closing at regular time intervals the communication between said induction manifold and the engine, which comprises the steps of injecting the fuel into said induction manifold shortly after the beginning of the induction cycle, onto said valve, introducing the air/fuel mixture into the engine with the lowest possible turbulence, whereby the fluid fed to the engine consists firstly of pure air during the initial part of the induction cycle, then of a very rich mixture and subsequently of a leaner mixture, the engine being filled with a non-homogeneous mixture during the last part of said induction cycle, and producing at the end of the compression cycle a high turbulence of the whole of said non-homogeneous mixture and igniting said non-homogeneous mixture in the turbulence zone.

References Cited in the file of this patent

UNITED STATES PATENTS 2,306,733     Joslyn _____ Dec. 29, 1942

FOREIGN PATENTS 779,978     Great Britain _____ July 24, 1957